United States Patent
Khaitan et al.

(10) Patent No.: US 9,269,993 B2
(45) Date of Patent: Feb. 23, 2016

(54) RECHARGEABLE MULTIPURPOSE SMART POWER SOURCE

(75) Inventors: Yashraj Khaitan, Berkeley, CA (US); Jacob Dickinson, Berkeley, CA (US)

(73) Assignee: Gram Power, Inc., Berkeley, CA (US)

( * ) Notice: Subject to any disclaimer, the term of this patent is extended or adjusted under 35 U.S.C. 154(b) by 834 days.

(21) Appl. No.: 13/100,957

(22) Filed: May 4, 2011

(65) Prior Publication Data

US 2011/0273132 A1  Nov. 10, 2011

Related U.S. Application Data

(60) Provisional application No. 61/331,247, filed on May 4, 2010.

(51) Int. Cl.
*H02J 7/00* (2006.01)
*H01M 10/46* (2006.01)

(52) U.S. Cl.
CPC .............. *H01M 10/46* (2013.01); *H02J 7/0068* (2013.01); *H02J 7/0031* (2013.01); *H02J 2007/004* (2013.01)

(58) Field of Classification Search
CPC ...................................................... H02J 7/0042
USPC .................................. 320/107, 110, 112, 121
See application file for complete search history.

(56) References Cited

U.S. PATENT DOCUMENTS

| | | | | |
|---|---|---|---|---|
| 4,158,818 A * | 6/1979 | Lerner | ............... | H03H 11/1217 327/557 |
| 5,547,775 A * | 8/1996 | Eguchi | ............ | G01R 19/16542 320/116 |
| 5,783,327 A | 7/1998 | Mendolia | | |
| 5,963,014 A * | 10/1999 | Chen | ..................... | H02J 7/0027 320/110 |
| 6,027,828 A * | 2/2000 | Hahn | .................. | H01M 2/1022 429/100 |
| 6,651,175 B1 * | 11/2003 | Slama | ............................. | 726/30 |
| 7,603,085 B2 * | 10/2009 | Pan | ........................ | H04B 1/123 455/226.1 |
| 7,679,326 B2 * | 3/2010 | Makwana | ............. | G06F 1/1632 320/107 |
| 7,934,099 B2 * | 4/2011 | Biely | .................... | H04L 9/3226 713/176 |

(Continued)

*Primary Examiner* — Richard Isla Rodas
*Assistant Examiner* — Michael DiBenedetto
(74) *Attorney, Agent, or Firm* — Goodwin Procter LLP

(57) ABSTRACT

A rechargeable multipurpose power management system has a power management system that can include a plurality of power management units. The power management units sources can be individually activated and deactivated (I think there might be a confusion between power sources and the system. Everything is within one box itself (the image that I sent you). Each unit is a power management system that can be connected to a variety of INPUT power sources. Several power management units can be combined together to create a stack of them but each one can operated individually as well). and each one is configured to be coupled to a variety of inputs. A rechargeable battery is coupled to the (One rechargeable battery is attached to only one power management units). A charging controller provides regulated charging to the battery. A plurality of convertors are (do we need to specify here what kind of converters, like DC-DC converters) coupled to the battery and provide output voltages that are accessible individually. A plurality of sensing circuits sense external signals and provide selective activation or deactivation of the system.

39 Claims, 4 Drawing Sheets

(56) References Cited

U.S. PATENT DOCUMENTS

| | | | |
|---|---|---|---|
| 2001/0027500 A1* | 10/2001 | Matsunaga | G06F 13/385 710/104 |
| 2005/0186994 A1* | 8/2005 | Rahmel | H02J 17/00 455/572 |
| 2008/0258677 A1* | 10/2008 | Lee | 320/101 |
| 2010/0090644 A1* | 4/2010 | Nokkonen | G06F 1/26 320/107 |
| 2010/0106631 A1* | 4/2010 | Kurayama et al. | 705/34 |
| 2011/0163719 A1* | 7/2011 | Law | 320/110 |
| 2011/0258251 A1* | 10/2011 | Antoci | G06F 1/26 709/203 |
| 2011/0266997 A1* | 11/2011 | Krancher | H02J 7/0044 320/107 |
| 2011/0291611 A1* | 12/2011 | Manor | H02J 7/022 320/107 |

* cited by examiner

RECHARGEABLE MULTIPURPOSE SMART POWER SOURCE

CROSS-REFERENCE TO RELATED APPLICATIONS

This application claims the benefit of U.S. Provisional Patent Application No. 61/331,247, filed May 4, 2010, which application is fully incorporated herein by reference.

FIELD OF THE INVENTION

The present invention relates to portable personal electronics, particularly to a power management unit, which can be activated externally for a temporary period or permanently and that is rechargeable. It can be charged with a whole range of energy sources that provide either fluctuating (like solar panels, dynamos and the like) or constant voltage (like a wall adapter) as output. In addition the power management units (multiple power management units are referred as a power management system) are stackable which allows them to output a variety of voltages and variable amount of power that may be used to run a variety of end appliances, including cellular telephones, personal stereos, memo recorders, mini televisions, lights, computers, fridges, and the like.

BACKGROUND OF THE INVENTION

In recent years, advances in miniaturization have generated a great variety of personal electronic devices. Indeed, many people have come to depend on cellular telephones, electronic address books, personal digital assistants (PDA's) and pagers for their day-to-day professional lives. Likewise, consumer electronics such as personal stereos and hand-held video games are common recreational devices.

A feature common to all these personal electronics is the need for some type of energy storage to supply power. Particularly in off-grid areas or regions with irregular power supply, batteries remain as the predominant form of energy. Users need to carry multiple batteries to power their devices and also need to be able to provide a whole range of voltage and current ratings to meet the power requirements of different appliances. Even in areas with constant grid power, high drain devices such as cellular telephones, often require the user to carry multiple batteries and perhaps a charging station for even relatively short trips. The user must constantly track the remaining battery capacity for each device to ensure that the charge will hold for a desired length of time.

Alternatively, the user must carry spare batteries. Since each electronic device typically has its own requirements and form factors, the user might be forced to carry several different spare batteries to power the various devices. It is also quite desirable to provide these personal electronic devices with rechargeable batteries, both for their relative economy and to minimize environmental impact. However, such recharging systems are rarely compatible. One device's charger often will not recharge another's battery, nor will that battery be usable with a different device.

In the prior art the devices are mentioned in U.S. Pat. Nos. 5,783,327, 6,027,828. These devices stack batteries for discharging and require special connections and switches to create different voltages. The single use batteries are discarded after the charge is depleted. However, some batteries are designed to be rechargeable. Rechargeable batteries typically require some form of battery charging system. Typical battery charging systems transfer power from a power source, such as an AC wall plug, into the battery. The recharging process typically includes processing and conditioning voltages and currents from the power source so that the voltages and currents supplied to the battery meet the particular battery's charging specifications. For example, if the voltages or currents supplied to the battery are too large, the battery can be damaged or even explode. On the other hand, if the voltages or currents supplied to the battery are too small, the charging process can be very inefficient or altogether ineffective. Inefficient use of the battery's charging specification can lead to very long charging times, for example. Additionally, if the charging process is not carried out efficiently, the battery's cell capacity (i.e., the amount of energy the battery can hold) may not be optimized. Moreover, inefficient charging can impact the battery's useful lifetime (i.e., number of charge/discharge cycles available from a particular battery). Furthermore, inefficient charging can result from the battery's characteristics changing over time. These problems are compounded by the fact that battery characteristics, including a battery's specified voltages and recharge currents, can be different from battery to battery.

Existing battery chargers are typically static systems. The charger is configured to receive power from a particular source and provide voltages and currents to a particular battery based on the battery's charge specification. However, the inflexibility of existing chargers results in many of the inefficiencies and problems described above. It would be very advantageous to have battery charging systems that were more flexible than existing systems or even adaptable to particular batteries or the changing battery charging environment. Thus, there is a need for improved battery charger systems and methods that improve the efficiency of the battery charging process.

Accordingly, there has been a need for a system to integrate the power supplies of multiple personal electronic devices. There has also been a need for a power management system that knows, what it is being charged from, what it is charging and how much power it is to deliver.

In places that are currently off the grid or receive an unreliable supply of power, there is a lack of choice to purchase a multipurpose power source that can be used to power a wide variety of electronics. Largely, people have access to singular appliances such as solar powered LED lanterns, solar fans, heaters etc. To buy each new appliance, the user must purchase the entire set of generator, storage device and the end appliance. These components are usually integrated into one device and the user can use them only for a particular application, for example lighting. Thus, there is an urgent need of a power management system that can be used to power a variety of appliances and that can be connected to more than one end appliance simultaneously. There is also a need of a power management system that be charged by all available renewable sources of energy or, thus making optimum use of the available resources.

In areas described above, the current solutions like solar lanterns are extremely expensive for the end user. Since typical family incomes in these regions are around $40-$150/month, a single solar lantern usually costs upwards of 50% of the monthly household income. Other solutions like kerosene or diesel powered microgrids are extremely harmful to the environment and provide mostly lighting for very few hours/day because of their high operational costs. Thus, there is a need for a power management system that can not only provide high utility by powering a whole range of appliances like lights, fans, radios, cell phones, TVs, and other commonly found household appliances, but it also needs to be purchased in small cash amounts over a period of time since income levels in these areas are extremely low. Thus, to ensure regular payments the power source needs to be smart enough to deactivate itself after expiration of the installment/payment period. Also, it should be able to get activated for a fixed period of time based on how many installments have been paid by a user. This allows users to adopt a payment scheme suited to their varying income levels thus making the device extremely affordable.

The power sources as disclosed under prior art batteries do not allow different kinds of input generators to charge the unit. Though stacking of the sources are disclosed in the prior art but they are not facilitated for charging and/or output purposes simultaneously. The present disclosure provides a solution overcoming the prior art problems by proposing a stack, wherein, without any moving part, two modules can be stacked together by simply placing one on top of the other. The inputs and outputs get connected automatically to enable simultaneous multi-cell charging and high power dissipation. When stacked, there is more than one module producing the output and thus the total output power increases linearly with the number of units stacked. This further cleans the output voltage since the errors due to passive components get averaged. Thus, high power appliances can be operated with even better input power characteristics.

SUMMARY OF THE INVENTION

An object of the present invention is to provide a power management system (combination of power management units) that can provide clean power to off grid areas.

Another object of the present invention is to provide power management systems that are very clean, and have low noise power to run sensitive electronic appliances such as LEDs, cell phones, computers, and the like.

A further object of the present invention is to provide a power management system capable of being charged by a large variety of renewable energy sources such as solar panels, mini wind generators, micro hydro power generators, human powered generators, and any other source that is capable of providing a voltage greater than that of a single lithium ion cell, which is typically 3.7V. In grid-connected regions, a current limited wall adapter (5V, 1 A for example) that is commonly used to charge cell phones can be used to charge the power management system as well.

Still a further embodiment of the present invention is to provide a power management system capable of being activated for fixed periods of time based on the amount of installment payment made.

Another embodiment of the present invention is to provide a power management system capable of being stacked on top of each other to supply higher amounts of power to operate high power appliances.

Yet another embodiment of the present invention is to provide a power management system capable of being protected from short circuit and overload conditions, where the output voltage is constantly monitored and when the output voltage less than the specified threshold, the smart source is automatically shut down to prevent damage.

BRIEF DESCRIPTION OF THE DRAWINGS

FIG. 2 (*b*) is a 3D rendering illustrating the exploded view showing the different components used for assembly of the housing of the power management system in accordance with the present invention

DETAILED DESCRIPTION

Figure 1:
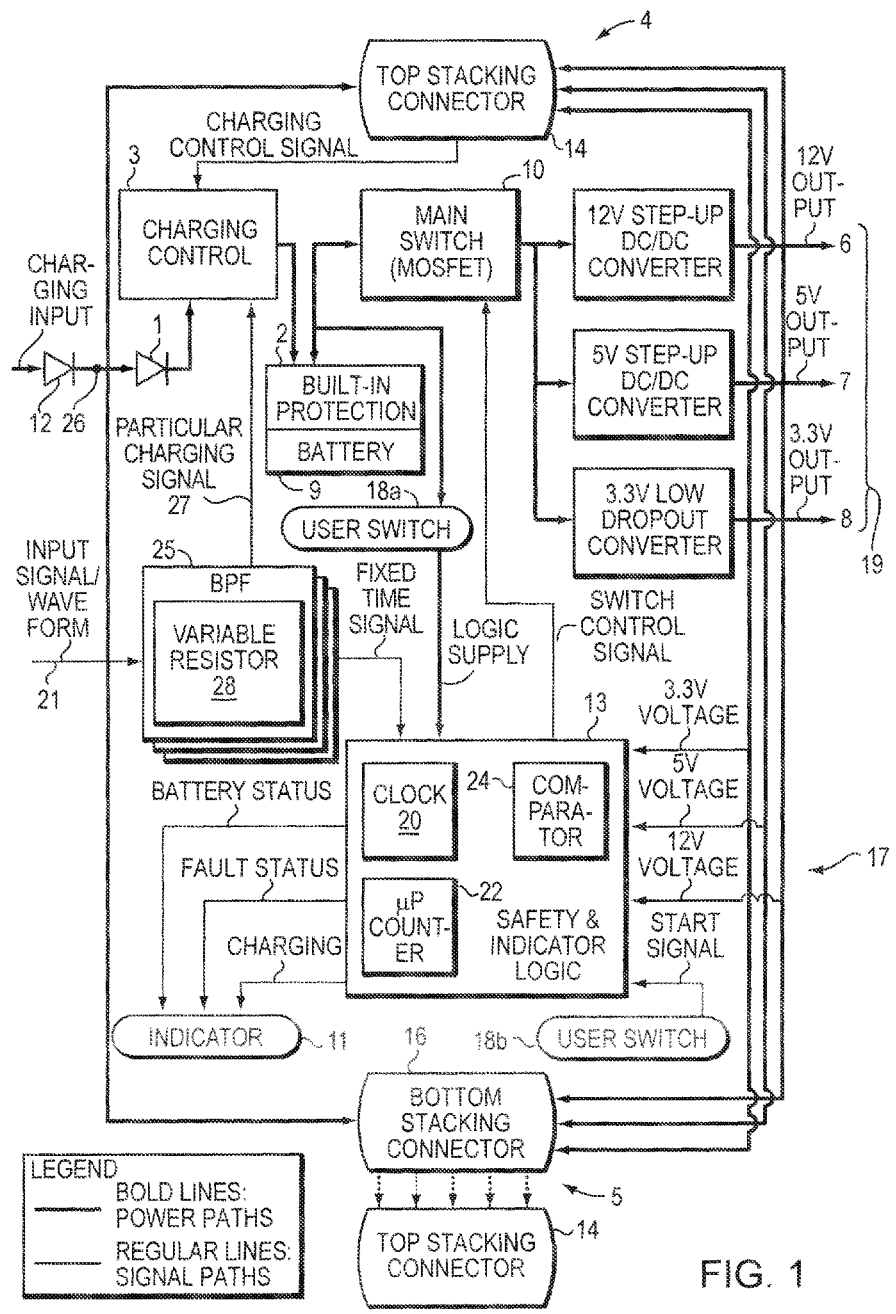
FIG. 1 is a block diagram illustrating the different components and working of the power management system in accordance with the present invention.

The power management system of the present invention is a scalable source of electricity that can be used as an individual unit to power multiple appliances simultaneously or can be stacked together to drive high power appliances and/or even more low power appliances simultaneously. FIG. 1 is a block diagram that illustrates an embodiment of the present invention with a power management system, charging input, stacking, and output voltages to run different appliances. With reference to FIG. 1, herein disclosed a rechargeable multipurpose power management system, comprising essentially of a rechargeable battery unit; a microcontroller configured for providing safety, control signals and device activation/deactivation; a plurality of connectors (14, 16) disposed on top and bottom of the housing to connect different power management systems; an internal circuitry (17) connecting all the components; a charging controller configured for providing regulated charging to the battery; a plurality of user switches for external activation and control; a plurality of convertors configured for providing output with a plurality of output connectors (13) and a plurality of filters used to detect particular frequency signals from an external activation device.

As per one of the embodiment of the present invention, the power management system can be charged from a variety of input energy sources like solar panels, grid supply, micro wind generators, bicycle dynamos, micro hydro power plants, etc. In the prior art there are readily available multiple charging topologies to charge lithium ion batteries like switch mode regulators, pulse charging and linear regulator charging. These commercially available converters all follow a constant current-constant voltage charging curve to charge the lithium ion battery. During constant current, the converters provide a fixed current to the battery and during constant voltage they try to maintain a constant charging voltage. However, during the constant voltage stage, the charging voltage is always greater than the battery voltage and is not particularly constant as long as the battery keeps accepting charge, i.e., as the battery keeps getting charged it's voltage increases and so does the charging voltage to continue to push charge into the battery till it reaches its maximum allowable voltage. As an example to charge a lithium ion battery using a buck boost SEPIC converter such as the LT1512 by Linear Technologies during constant voltage mode the voltage increases from 4.2V-4.7V to push enough charge into the battery such that when the charging stops the battery remains at 4.2V.

Figure 2A:
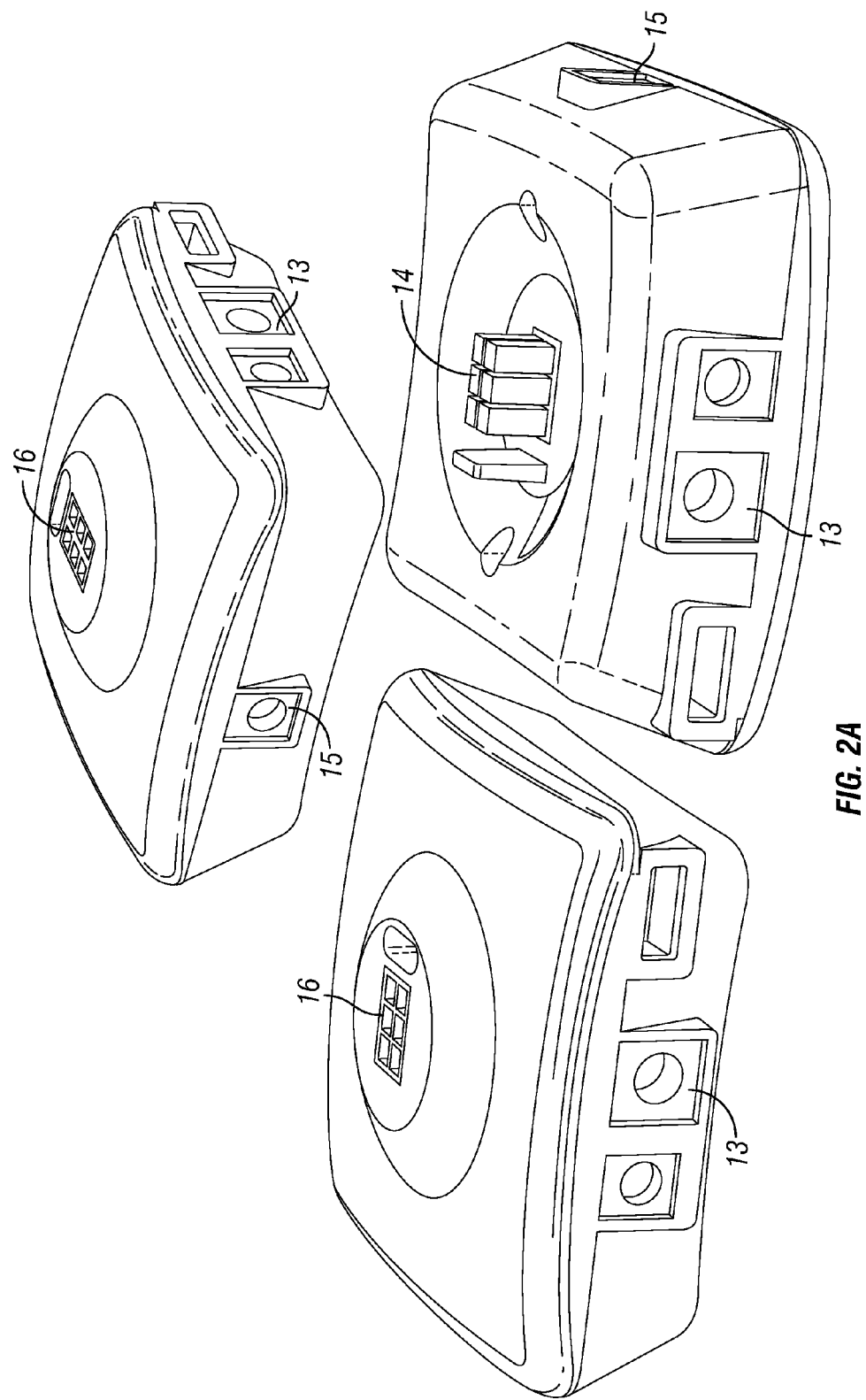
FIG. 2 (*a*) is a 3D rendering illustrating the side, top and bottom views of the housing of the power management system in accordance with the present invention.
Figure 2B:
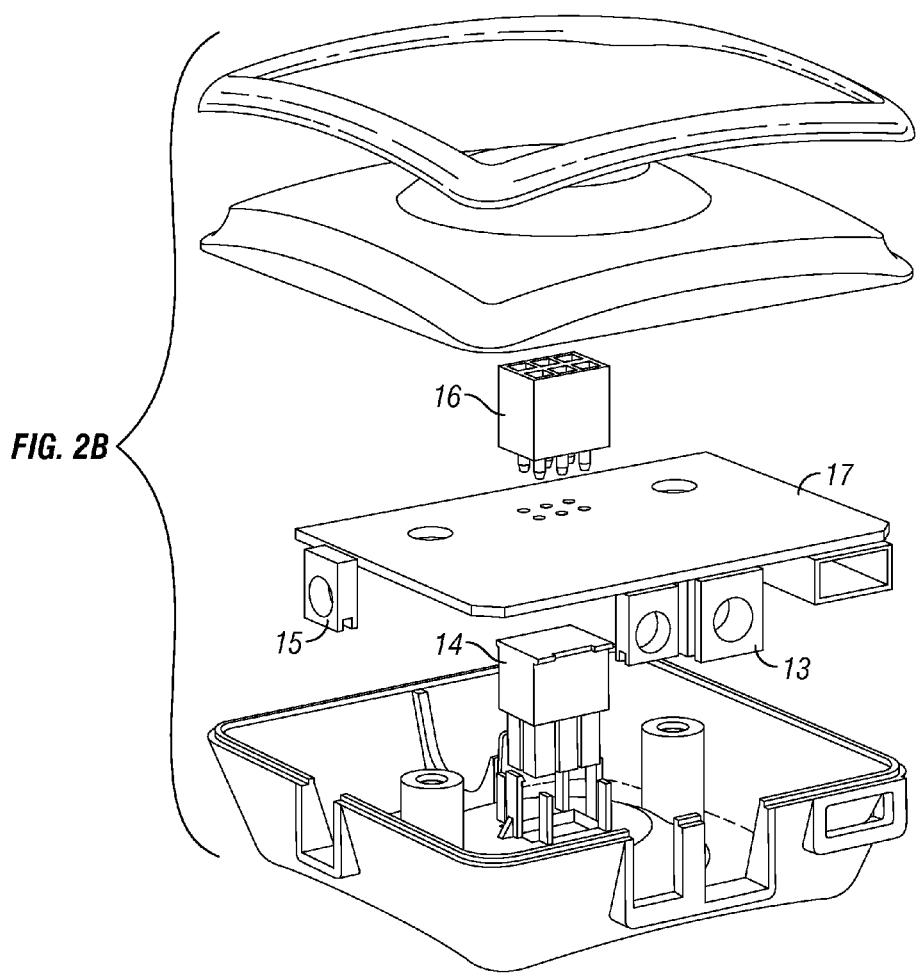

In accordance with the present invention, referring to FIGS. 1 and 2, the input energy source configured for the power management system such as a solar panel, bicycle dynamo or 5V wall adapter is connected directly to the battery during constant current mode. This avoids any power loss as all the power from the input energy source goes straight into the battery. A reverse blocking diode 1 is used to prevent current from flowing from the battery to the input energy source, or under a stacking configuration, it prevents current from flowing from one battery to another battery.

Solar panels, bicycle dynamos and current limited wall adapters are examples of non-ideal voltage sources, i.e., they cannot maintain a constant voltage for all levels of output current because the total power output of these devices is limited. Our device exploits this property of non-ideal voltage sources being used as our charging sources to keep the charging circuitry extremely low cost. Since a battery is a stronger voltage source than these input energy sources, it controls the voltage output from these sources. Thus a 3 W bicycle dynamo when connected to a 3 V battery will output 3V, 1 A when connected to the battery. It will output 4.2V, 0.75 A when the battery voltage reaches 4.2V and the bicycle dynamo is operating at full efficiency. Thus we see that the current here goes down as the battery voltage increases and the battery voltage determines the charging voltage until it decides it's fully charged. The battery has further internal protection 2, which keeps comparing the battery voltage (not charging voltage) to a reference voltage. Sampling the battery voltage at fixed intervals does this comparison. When the battery voltage goes above this reference voltage, it stops charging thus, preventing it from getting damaged.

Therefore in accordance with the disclosed topology the power management system is able to get charged without doing any DC-DC conversion or external voltage regulation and the fact that the current keeps going down as the battery voltage increases prevents the battery from having a shorter life. This topology still supplies currents and voltages that are well within the maximum prescribed limits by the battery manufacturer, due to the natural tendency of non-ideal voltage sources to supply lower current for higher voltages.

Further in an embodiment, the disclosed power management system can be configured for a particular type of input energy source. Allowing the power source to be charged only when a particular signal is sent to the charging switch/MOSFET gate 3 does this. The device is thus made secure enough that it won't charge from any other source than it is designed to interface with as only the specific source generates this particular signal. This configuration of the power management system allows charging stations to securely rent the technology out to users. For users who wish to purchase the power management system instead of renting it, a different version of the power management system is made available that can interface with the several charging sources described earlier without being restricted to a single source of charging.

As per yet another embodiment and with reference to FIGS. 1 and 2, the power management system can be stacked on top of each other. The stack can be charged from a single input energy source and any output on the stack can be used to power a larger appliance or all the different outputs can be used to power the appliances available in the household.

Each individual power management system has its own charging protection and DC-DC converters to generate a variety of output voltages. When the respective charging nodes and individual output nodes are connected in parallel the units get stacked. This is done with the help of male and female connectors placed on opposite ends of the device (4 and 5). When charging a stack, different batteries might have different voltages. However, since each battery is protected with a diode 1, current does not flow from one battery to another. Also, when charging a stack all batteries reach the same voltage at the end of the charging period and each battery receives only as much current as is required because the highest battery voltage decides the voltage of the entire node and current does not flow between batteries. On the output side, respective output voltages are connected in parallel, i.e. 12V output 6 on one device is connected to 12V output on the other and so on. Having outputs connected averages the respective output voltages and helps maintain a single output voltage across each port of the stack. Eg: if one power source in the stack outputs 11.9V, and the other outputs 12.1V, the entire stack will end up outputting 12V. Since all DC-DC converters have feedback control, and voltages get averaged, there is no short circuit or high current flow between individual power sources when stacked. Moreover, this stacking now allows current from all batteries to flow through a single output to provide more power to run bigger appliances. For example, each 5V output on the device provides 1 A. When three are stacked they can provide up to 3 A and power a 15 W appliance as compared to a 5 W with a single power management system.

Therefore, any input source that can produce an output voltage equal to or greater than that of a single lithium ion cell can charge the power management system of the present invention. AC generators if used in on-grid areas need to be rectified. Standard wall adapters (5V, 1 A or less) that charge cell phones can be used to charge the power management system. The present invention can be applicable to off grid areas too where there is no power, either AC or DC. An individual power management system has a 11 Wh battery. Thus the input energy source must be able to supply less than 11 W of power to charge the battery 9 inside the unit, as the battery itself has limitations on how much power can be provided to it continuously for charging.

As per another embodiment, with reference to FIG. 1, the power management system can be activated externally by passing a waveform of a particular frequency that the circuitry inside reads and interprets to activate the device for a fixed period of time. After the expiration of this time, the device turns off automatically preventing the user from using it without paying the next installment. The disclosed activation/deactivation is just like cell phone accounts that can be externally activated or deactivated based on the amount of balance remaining. The said power management system uses an external USB dongle that can activate or deactivate it for fixed periods of time.

The power management system can be externally activated with a USB dongle that provides a waveform of particular frequencies on the data pins of the USB port to activate the device for certain periods of time. This waveform is passed through different band pass filters attached to the microcontroller inputs in the power management system. If the input frequency is within the range of frequencies that the band pass filter accepts, only then does the signal go through. The microcontroller then interprets the signal and controls the main switch MOSFET 10 as shown in FIG. 1 that turns the device on or off. The microcontroller's internal clock is used to deactivate the unit after the period of time for which the device has been activated expires. Just changing the resistor value can change the band pass filter range and the USB dongle can be re-programmed to provide different frequencies. This entire operation can be done in pure analog and digital circuitry as well without using a microcontroller. Moreover, instead of using time periods, the number of recharge cycles can be used as a metric to measure the amount one has used the device. Thus, users can buy battery recharges instead of minutes and the microcontroller's internal counter can deactivate the unit after the paid number of recharges have expired.

Further in another embodiment, the power management system is configured for live continuous protection against short circuit and overload. The outputs of the power management system (6, 7, and 8) are current limited due to the power limitations on the DC-DC converters used inside. Thus when a higher power device is connected to the power management system, due to high current flow the voltage drops. The power management system compares this voltage to a reference voltage using a comparator and if the voltage is lower than the reference voltage, the device shuts off and turns on an overload LED (one of the indicators in 11). If there is a short circuit to ground, the output voltage most certainly drops below the reference voltage and so the comparator turns the device off. The comparator controls the gate of the main switch MOSFET 10, whose voltage is made high or low by the comparator to turn it on or off. In addition using the disclosed smart source is very safe, since its output pins and/or connector pins cannot be shorted easily since they are covered from all sides with insulated material of the housing.

Figure 3:
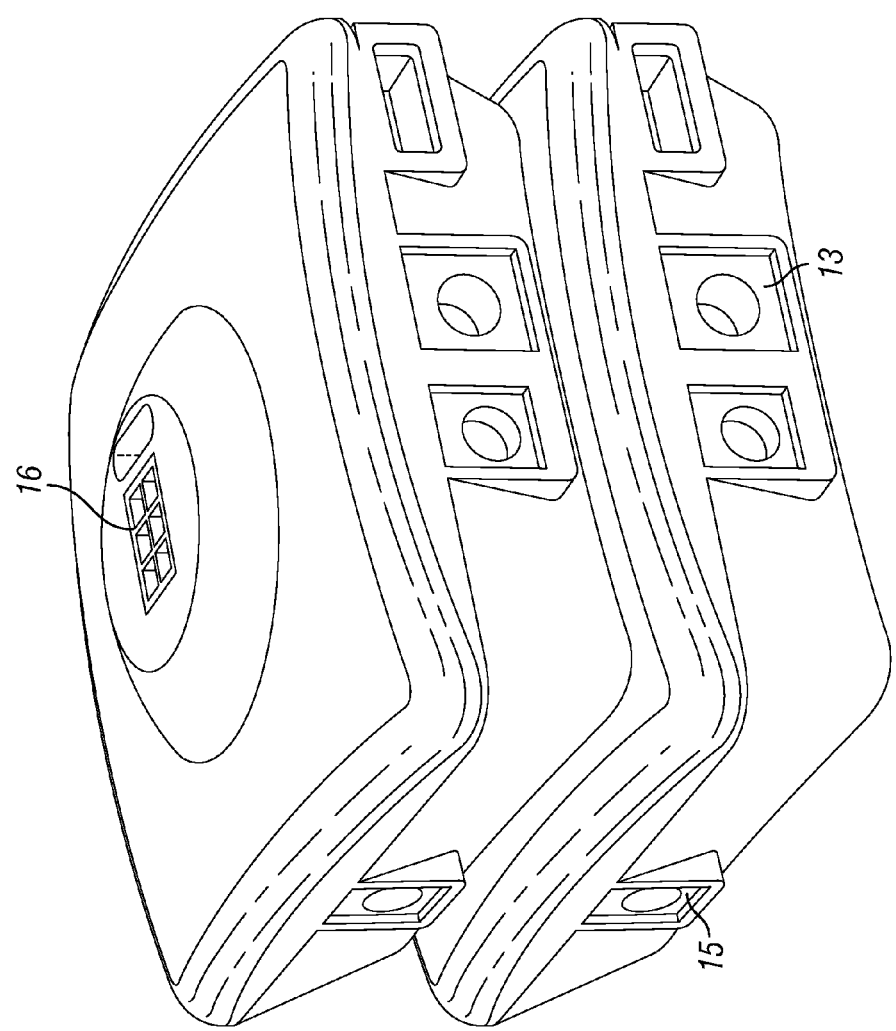
FIG. 3 is a 3D rendering illustrating how 2 power management systems can be stacked on top of each other in accordance with the present invention.

The power management system of the present invention can have one or more stacked modules, as illustrated in FIGS. 2-3, and provides a very clean source of power that is particularly suitable for sensitive electronic power devices, including but not limited to LEDs, mini televisions, cell phones, media players, fridges, computers and the like. Grid power in developing countries is plagued by large surges in voltage and currents that destroy electronic appliances. Almost all these appliances convert AC to DC power to run themselves. The current invention converts unstable power from renewable energy sources and even wall adapters to stable energy in a lithium ion battery. The device then produces stable outputs to run many types of electronic appliances.

The power management system can be used individually to power appliances. If the connected power appliances require more energy than what a single power management system can provide, then one can stack individual units to deliver more power. Also, if one wants to charge a plurality of smart power modules from a single input energy source, then a plurality of power management systems can be stacked for charging. Therefore the power management system herein disclosed can use a single input source to charge one or a stack of power sources. Each power source has its own battery management, which allows a single input source that may have very unstable outputs to still charge the entire stack in a controlled fashion.

The power management system as disclosed herein may have one or more modules. The power rating of the output connectors used in the external circuit determines the rating. At present the output connectors can handle power from 5 modules stacked together, but the connectors can be changed to higher power ratings very easily to allow even more units to be stacked. Moreover, several stacks of 5 can be combined on another auxiliary device that has its own high power connectors. This allows higher levels of stacking without changing anything in the standard power management system.

An input energy source charges a single power management system or a stack of several of them put together. When several power modules are stacked together, just one generator can be used to charge all of them simultaneously. Also, in the stacked configuration multiple generators of different types can be used to charge the stack simultaneously. This is achieved by using two diodes 1 and 12 in the forward biased mode from the generator to the battery. And the node between the two diodes is connected in parallel with the respective node in the other power management system. This prevents current from flowing into generators and out of the battery and allows current to only flow into the battery. With the present invention, module monitoring and discharge can be provided for each module, either with a single module or with a plurality of stacked modules. The stacking is carried out with the support of a specially designed housing as shown in FIGS. 2 and 3 and is described in the later part.

Every module has its own charge controller. This prevents batteries in different charge states from interacting with one another and getting spoilt. With lack of inter-battery interaction, the circuit prevents individual batteries from getting shorted to one another. The shorting would lead to a very high current flow that would damage the battery permanently. To ensure long battery life, each battery has its own charge monitoring circuit that follows the correct constant current-constant voltage charging cycle for its respective cell.

In accordance with the present invention, referring to FIG. 2, the power management system further comprises a housing to encompass/accommodate the different components and the plurality of connections pertaining to the said source. The said housing is configured to receive "stackable" batteries, which are stackable on top of one another. As shown in FIG. 2($b$), the said housing further includes a front cover coupled to a top and bottom housing, which is adapted to receive the rechargeable battery and the other components/connections for control and powering the said power management system. In addition there is also provided an intermediate housing placed in between the top and bottom housing to accommodate the internal circuitry and the connections leads. In preferred embodiments, the said housing is designed as thinly and flatly as possible in order to correspondingly accommodate the other stackable batteries over the top such that a stackable battery kit (including two or more batteries) utilizes the entire surface area of the bottom power management system and has as little volume as possible and is comfortable to handle. The output connections including the USB port is disposed on the sides of the said housing.

Further in an alternative arrangement, the top stacking connector is disposed over the top housing at its centre and the bottom stacking connector is disposed at the bottom housing at its centre. The housing also includes a first latching mechanism formed over the top surface and a second latching mechanism formed over the bottom surface. An exemplary peg/upright and post latching mechanism is illustrated schematically in FIG. 2, 3 is present at the second latching location i.e. bottom housing and a complementary recess is present at the top housing to exactly match the surfaces of top and bottom surfaces of the stacked power management systems. The first latching mechanism is in the form of a bulge which is complementary with the second latching mechanism and is in the form of recess. However, any suitable latching mechanism could be used. The top and bottom surfaces of the said housing is designed in order to provide holding and locking purposes and therefore a plurality of such sources could be stacked without and fall or balance disorder. With this arrangement the male post could be slightly deflected with the application of force, thereby enabling the male locking peg to be released from the female catch. In another embodiment the male latch may be mechanically connected to a release button to allow removal of the stack.

As a non-limiting example, all of the outputs can be stacked to provide as much power as necessary. As a non-limiting example, five modules are stacked together. In one embodiment, a stacking auxiliary is used to stack several 5-stacked modules into one another for still greater power output. Further the power management system of the present invention can have 3 output connectors, one input connector, 2 stacking connectors. The number of stacking and output connectors can be increased to provide a wider variety of voltages through a combination of the voltages being produced at present. The power source includes power dissipation circuitry that produces, as a non-limiting example, 3.3V, 5.0V, 12.0V for appliances that can be connected to the module.

As another non-limiting example, an efficient low dropout linear regulator can create 3.3V, 12V and 5V can be generated by efficient switch mode step up converters to minimize power losses. These voltages can be created by any form of DC-DC conversion such as switch mode buck, boost, buck-boost power supplies, linear regulators, SEPIC converters, switched capacitor circuits and the like.

In one embodiment, stackable cables are used to connect the same power module to a variety of appliances. In this manner, the existing appliance does not need to be modified in any manner. This also allows a single power management system to run a variety of appliances. In one embodiment, the stackable cables are simple male input jacks with male-female output connectors, similar to Y splitters.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

The invention claimed is:

1. A rechargeable multipurpose power management system for powering, comprising:
    a plurality of stackable power management modules, each power management module capable of being individually activated and deactivated, each power management module comprising:
    a rechargeable battery;
    at least one input connection for coupling the module to at least one input energy source;
    a charging controller configured for providing regulated charging from the at least one input energy source to the rechargeable battery;
    a plurality of convertors coupled to the battery, wherein each of the plurality of converters is configured to provide a plurality of variable, individually-accessible-output voltages at a corresponding plurality of output connectors; and
    a plurality of sensing circuits that are adapted to sense signals from an external activation device and to individually and selectively activate the modules for a period of time based on the sensed signals.

2. The system of claim 1, wherein the charging controller includes discrete circuitry to regulate charging of the rechargeable battery.

3. The system of claim 1, further comprising:
    a microcontroller that is structured and arranged to generate and receive control signals to provide at least one of: activate the module, deactivate the module, protect the module against voltage overload, and protect the module against short circuit conditions.

4. The system of claim 1, further comprising:
    a system housing; and
    a first stacking connector that is disposed on a top portion of the housing of the module and a second stacking connector that is disposed on a bottom portion of the housing of the module, for stacking a first module to a second module for higher power output.

5. The system of claim 3, further comprising:
    internal circuitry that couples the microcontroller to the rechargeable battery, the charging controller, the plurality of convertors, and the plurality of sensing circuits.

6. The system of claim 1, wherein the plurality of sensing circuits includes:
    a plurality of filters.

7. The system of claim 1, wherein the rechargeable battery includes:
    a plurality of filters coupled to the rechargeable battery to filter signals for activation/deactivation of the entire device or for recharging the battery with credits to turn back on.

8. The system of claim 1, further comprising:
    one or more input energy sources coupled to the at least one input connection of any module.

9. The system of claim 8, wherein the one or more input energy sources are selected from at least one of: solar panels, grid supply, micro wind generators, bicycle dynamos, and micro hydro power plants.

10. The system of claim 1, further comprising:
    a first reverse blocking diode operatively disposed between the one or more input energy sources and the rechargeable battery to prevent current from at least one of: flowing from the rechargeable battery to the one or more input energy sources and flowing from a first input energy source to a second input energy source.

11. The system of claim 10, further comprising:
    a second reverse blocking diode operatively disposed between the first reverse blocking diode and the rechargeable battery to prevent current from flowing from the battery to a battery of another module electrically coupled thereto.

12. The system of claim 1, wherein the charging controller compares a battery voltage of an individual power management module to a reference voltage using a comparator that is adapted to perform at least one of: keep the system on if the battery voltage exceeds the reference voltage; turn the system off if the reference voltage exceeds the battery voltage; and turn the system off if a short circuit is detected.

13. The system of claim 7, wherein the charge monitoring circuit is structured and arranged so that the one or more input energy sources charge the battery without at least one of DC-DC conversion and an external voltage regulation.

14. The system of claim 1, wherein power management modules can be configured for a particular type of input energy source to enable secure rental through charging station businesses.

15. The system of claim 1, wherein, in response to a power management module being configured for a particular type of input energy, the stacked power management modules do not charge from another input energy source.

16. The system of claim 1, wherein a plurality of power management modules are electrically coupleable in a stack to generate a variety of output voltages.

17. The system of claim 16, wherein the stack of power management modules is charged from a single input energy source.

18. The system of claim 16, wherein the stack of power management modules is charged from multiple input energy sources.

19. The system of claim 16, wherein, during a charging state of the stack, the module includes a reverse blocking diode to prevent current flowing from the battery to at least one of the other modules in the stack and the one or more input energy source.

20. The system of claim 16, wherein any input energy source is adapted to produce an output voltage equal to or greater than that of a single battery in the stack to charge the entire stack.

21. The system of claim 1 further comprising circuitry to activate the system for a fixed period of time upon detecting a signal from an external source.

22. The system of claim 21, wherein after expiration of the fixed period of time, the circuitry of the system is automatically deactivated.

23. The system of claim 21 further comprising circuitry to enable the system to be externally activated for certain a fixed period of time using a USB dongle that provides a waveform of particular frequencies on data pins of a USB port.

24. The system of claim 23, wherein the circuitry includes a plurality of band pass filters, each band pass filter of which is coupled to inputs for the power management module.

25. The system of claim 21, wherein the circuitry includes at least one of a plurality of filters and a plurality of sensing circuits, each filter corresponding to a range of passing frequencies such that any input frequency detected that is within the range of passing frequencies, triggers a controller.

26. The system of claim 25, further comprising:
one or more MOSFETs that turns the plurality of power management modules on or off.

27. The system of claim 25, wherein the controller includes an internal clock that is adapted to deactivate the module after expiry of a period of time.

28. The system of claim 25, wherein the controller includes an internal clock counter that counts a number of battery recharge events and that turns the module off after a pre-designated number of battery recharges has been reached.

29. The system of claim 25, wherein at least one of the plurality of filters and the plurality of sensing circuits includes a variable resistor providing variable resistance to provide different frequencies and frequency ranges, wherein a frequency range can be changed by changing a resistor value of the resistor.

30. The system of claim 23, wherein the USB dongle is configured to be re-programmable to provide a waveform at different frequencies.

31. The system of claim 1, wherein each of the plurality of power management modules is configured to provide continuous protection against short circuit and overload conditions of the system.

32. The system of claim 1, wherein each of the plurality of converters is a DC-DC converter configured to provide a different output voltage.

33. The system of claim 32 further comprising a fault detection device to detect a fault during a condition in which a high power device is connected at an output port of the system and a sufficiently high current flow causes an output voltage to be less than a reference voltage.

34. The system of claim 1 further comprising an overload indicator that is activated if an output voltage is lower than a reference voltage.

35. The system of claim 1, wherein each of the plurality of power management modules includes one or more indicators for indicating at least one of: battery status, fault status, and charging status.

36. The system of claim 33, wherein, under a condition that an output is a short circuit to ground, an output voltage drops below a reference voltage and an associated power management module is then in an off state.

37. The system of claim 12, wherein the comparator is adapted to control a gate of a MOSFET.

38. The system of claim 1, further comprising:
one or more output jacks or connector pins.

39. The system of claim 20, wherein the input energy source is a rectified AC generator.

* * * * *